United States Patent [19]

Meyer

[11] Patent Number: 5,594,520
[45] Date of Patent: Jan. 14, 1997

[54] LOW SUPPLY VOLTAGE SHUTTER DRIVER

[75] Inventor: Hans-Jurgen Meyer, Tucson, Ariz.

[73] Assignee: Photometrics, Ltd, Tucson, Ariz.

[21] Appl. No.: 391,710

[22] Filed: Feb. 21, 1995

[51] Int. Cl.$^6$ .................................................. G03B 9/08
[52] U.S. Cl. .......................................................... 396/463
[58] Field of Search ................................. 354/456, 226, 354/227.1, 234.1, 235.1, 266; 318/442, 794, 795, 797; 363/59; 323/901

[56] References Cited

FOREIGN PATENT DOCUMENTS 55-2268   1/1980   Japan ................................. 354/234.1

Primary Examiner—Howard B. Blankenship
Attorney, Agent, or Firm—Herbert M. Shapiro

[57] ABSTRACT

A mechanical camera shutter requiring voltage in the range of 30 to 60 volts is made to operate from a power supply which provides voltage such lower than is necessary for shutter operation by the inclusion of a capacitor which is charged to 15 volts. The capacitor is operated to add to the insufficient voltage of a power source to provide the requisite high voltage during a critical part of a cycle of operation of the shutter. The shutter driver circuit follows results from the recognition that the shutter requires the high voltage only during the short opening phase of the shutter cycle and is not required during the later holding phase when only a low holding voltage is required. The capacitor is recharged during the holding phase and provides the necessary increased voltage for the next shutter operation.

7 Claims, 2 Drawing Sheets

LOW SUPPLY VOLTAGE SHUTTER DRIVER

FIELD OF THE INVENTION

This invention related to camera shutter drivers and more particularly to such a shutter operative with a charged-coupled device (CCD) camera.

1. Background of the Invention

A mechanical camera shutter for a CCD camera requires a voltage of at least about 30 volts for operation. For low cost cameras, it is advantageous to utilize existing power supplies. Unfortunately, existing power supplies which are otherwise suitable generate only three voltage +5 V and ±15 V and turn out to be incompatible with such a shutter.

2. Brief Description of an Illustrative Embodiment

The invention is based on the recognition that a CCD camera shutter requires a high voltage only during an opening phase of the shutter. The voltage for holding the shutter open is sufficiently low to be supplied by existing power supplies. According to the principles of the present invention, a drive circuit includes a capacitor which is charged during the holding phase of a shutter cycle for supplying an increased voltage, which adds to that of the power supply, during the opening phase of the next shutter cycle. Consequently, a relatively low cost power supply can be used thus significantly lowering the camera cost.

DETAILED DESCRIPTION OF AN ILLUSTRATIVE EMBODIMENT OF THE INVENTION

Figure 1:
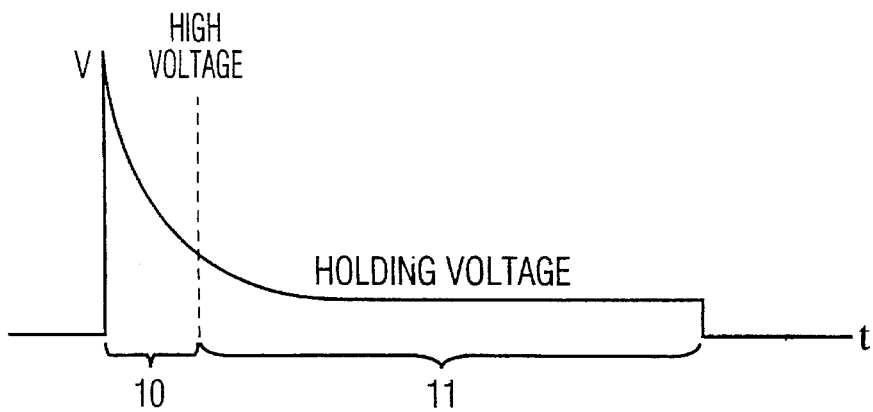
FIG. 1 is a timing diagram of a conventional CCD camera shutter.

FIG. 1 shows a timing diagram of a mechanical CCD camera shutter plotting voltage versus time. The voltage is high during an opening phase 10 of a shutter cycle and decays to a much lower holding voltage as indicated in the figure.

Figure 2:
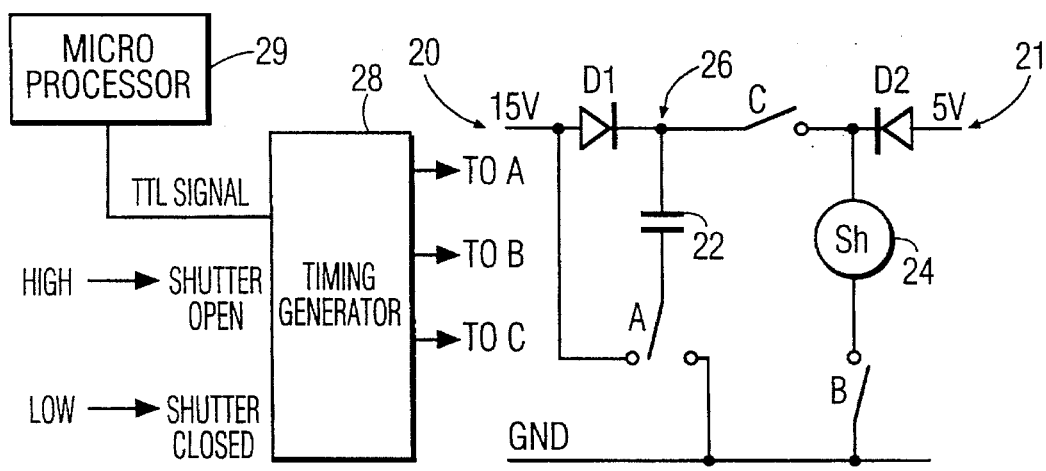
FIG. 2 is a block diagram of a driver circuit in accordance with the principals of this invention.

FIG. 2 is a block diagram of a driver circuit operative from a power supply supplying 15 volts and 5 volts at 20 and 21 in FIG. 2 for supplying the high voltage and the holding voltage required during the opening phase and the holding phase 10 and 11, respectively, of FIG. 1. The circuit includes a diode D1 and a capacitor 22 connected between the 15 volt output of the power supply, at 20, and ground via a double-poled switch A. The shutter 24 is connected to the 15 volt output via diode D1 and a switch C and is connected to ground via a switch B. The shutter also is connected to the 5 volt output of the power supply (at 21) via a diode D2.

In the shutter closed position, capacitor 22 is connected to ground and is thus charged to 15 volts via diode D1. Switches B and C are open so that no current is flowing through the shutter (24). In the initial opening phase, switch A connects capacitors 22 to 15 volts creating 30 volts at point 26. The resulting 30 volt level is the sum of the 15 volt power supply plus the 15 volt charged capacitor.

Switches B and C are closed simultaneously to connect the 30 volts to the shutters. The capacitor discharges into the shutter. The shutter opens (opening phase 10) and the voltage across the shutter decays to the 5 volt holding voltage. Diode D1 prevents the voltage at the shutter from dropping below 5 volts.

After a few milliseconds (after the opening phase 10), switch C opens to disconnect the shutter from the 15 volt supply and switch A closes to connect the capacitor back to ground (GND). Note that switch A is a two poled switch. The capacitor again charges to 15 volts even if the shutter stays open. Switch B remains closed as long as the shutter stays open.. Diode D2 ensures that the shutter is held open with 5 volts. Switch B opens to close the shutter thus readying the circuit for a next shutter cycle.

The switches are operative under the control of a timing generator 28 shown in FIG. 2. The timing generator, in turn, is responsive to TTL signals from microprocessor 29; high= shutter open; low=shutter closed.

Figure 3:
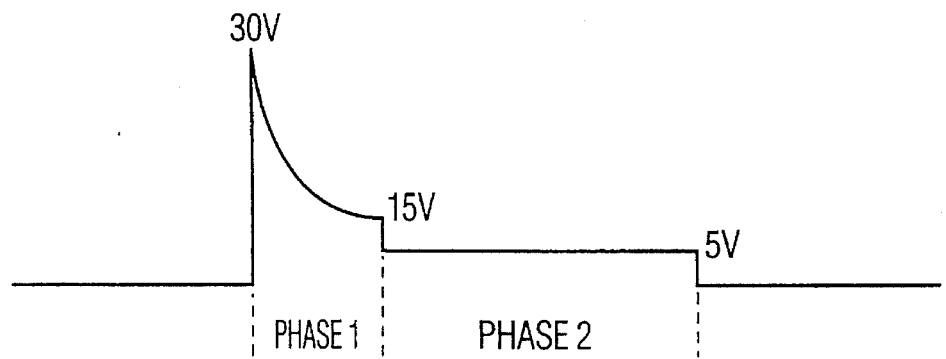
FIG. 3 is a timing diagram of the voltage on a camera shutter supplied by the driver of FIG. 2.

FIG. 3 shows the timing diagram for the voltage supplied by the circuit of FIG. 2 showing the voltage on the shutter. During phase 1, capacitor 22 discharges down from 15 volts. In phase 2, the capacitor is disconnected from the shutter and the shutter is held open with 5 volts, an operation closely corresponding to the conventional voltage requirements as shown in FIG. 1.

Figure 4:
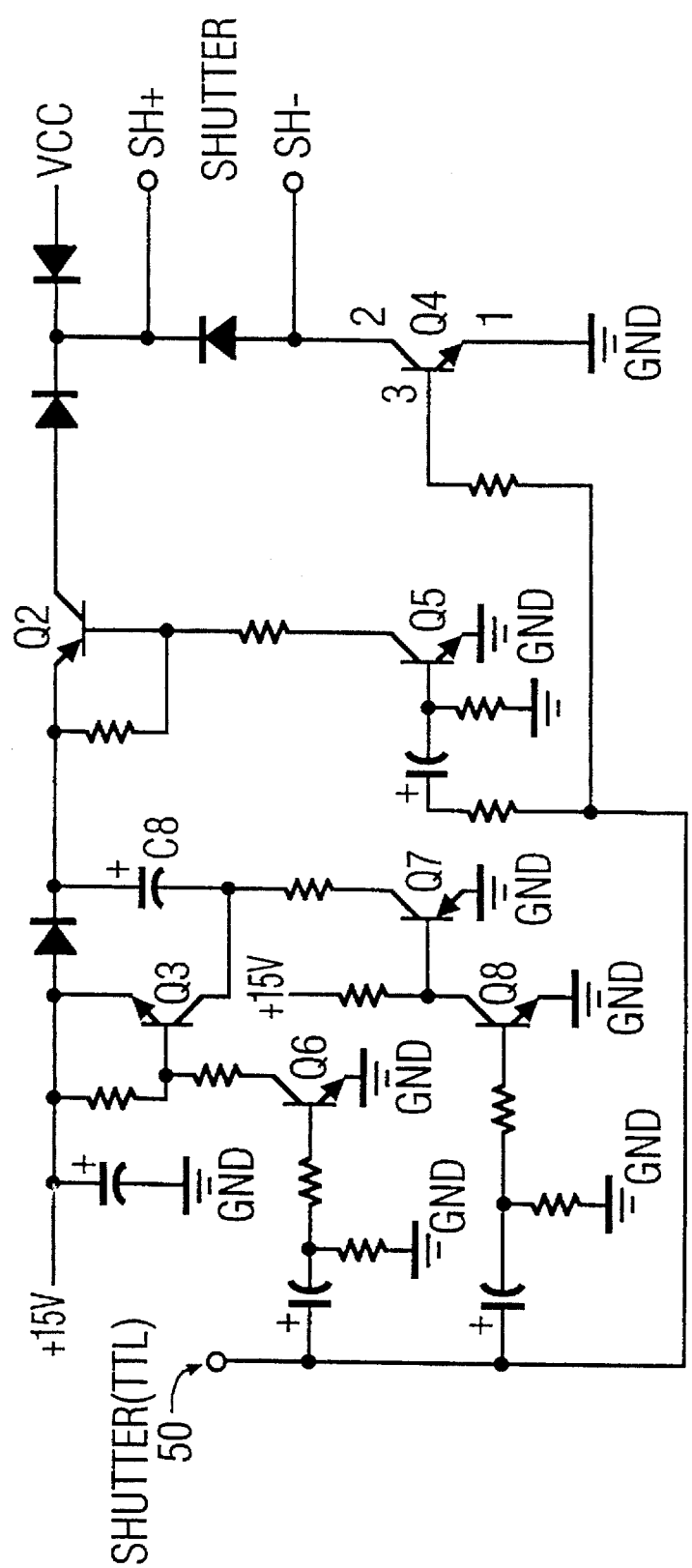
FIG. 4 is a circuit diagram showing the components of the block diagram of FIG. 2.

FIG. 4 is a circuit schematic of the block diagram of FIG. 2. Capacitor C8 is a 1000 Microfarad capacitor (i.e. 22 of FIG. 2) used to boost voltage during the opening phase of the shutter. Transistors Q3 and Q4 represent switch A of FIG. 2. Transistor Q4 represents switch B of FIG. 2 and transistor Q2 represents switch C. The transistors Q6, Q8 and Q5 together with the R-C time constant represent timing generator 28 ensuring that the switching transistors are activated at the right times responsive to the TTL signals at 50 in FIG. 4. Transistors Q5, Q6 and Q8 are BC818 transistors available from Motorola Corporation and may be any equivalent general purpose NPN transistor. Transistors Q2 and Q7 are Darlington PNP transistors and transistor Q3 is a Darlington NPN transistor all available commercially.

What is claimed is:

1. A driver circuit for a mechanical shutter for a CCD camera, said shutter requiring a first relatively high voltage for operation during an opening phase of a cycle of operation of said shutter and a second relatively low voltage during a holding phase, said circuit including a power supply supplying a third voltage equal to at least one half of said first voltage, said power supply also supplying said second voltage, said circuit including a capacitor and means for connecting said capacitor to said power supply for storing charge during said holding phase and for discharging during said opening phase to provide a fourth voltage additive to said third voltage for supplying said first voltage during said opening phase.

2. A circuit as in claim 1 wherein said fourth voltage equals said third voltage.

3. A circuit as in claim 2 wherein said means for connecting said capacitor comprises a first switch, said circuit also comprising a second and a third switch, said second and third switches being operative to connect said first and second voltages to said shutter, said circuit also including timing means for controlling said first, second and third switches for switching between an open and a closed state according to the following table:

| shutter phase | first switch | second switch | third switch |
| --- | --- | --- | --- |
| opening phase | pole 1 | closed | closed |
| holding phase | pole 2 | closed | open |
| closed | pole 2 | open | open |

4. A circuit as in claim 3 wherein said timing means comprises a timing generator responsive to a TTL circuit for producing logic level signals.

5. A circuit as in claim 3 wherein said capacitor is connected between a source of said first voltage and ground via said first switch and said first switch is a dual-pole switch operative to disconnect said capacitor from ground and to connect said capacitor to ground during said opening phase and said holding phase respectively.

6. A circuit as in claim 5 wherein said second switch is connected between said capacitor and a source of said low voltage and is closed during said holding phase.

7. A circuit as in claim 6 having said shutter connected between said source of low voltage and ground via said third switch, said shutter being connected electrically in parallel with said capacitor and said first switch via said second switch.

* * * * *